United States Patent
Cannon et al.

(10) Patent No.: US 6,735,209 B1
(45) Date of Patent: May 11, 2004

(54) ADDRESS DEFINITION FOR IP TELEPHONY SERVICES

(75) Inventors: Matthew J. Cannon, Dallas, TX (US); Steven R. Donovan, Plano, TX (US)

(73) Assignee: WorldCom, Inc., Clinton, MS (US)

(*) Notice: Subject to any disclaimer, the term of this patent is extended or adjusted under 35 U.S.C. 154(b) by 0 days.

(21) Appl. No.: 09/364,005

(22) Filed: Jul. 29, 1999

(51) Int. Cl.[7] .......................... H04L 12/28; H04L 12/56
(52) U.S. Cl. ...................................... 370/401; 370/352
(58) Field of Search ................................ 370/522, 401, 370/264, 229, 230.1, 231, 351–355, 360, 389, 392

(56) References Cited

U.S. PATENT DOCUMENTS

| | | | |
|---|---|---|---|
| 5,303,286 A | 4/1994 | Wiedeman | |
| 5,434,907 A | 7/1995 | Hurst et al. | |
| 5,634,012 A | 5/1997 | Logston et al. | |
| 5,664,009 A | 9/1997 | Hurst et al. | |
| 5,680,116 A | 10/1997 | Hashimoto et al. | |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,794,039 A | 8/1998 | Guck | |
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |
| 5,864,610 A | 1/1999 | Ronen | |
| 5,867,494 A | 2/1999 | Krishnaswamy et al. | |
| 5,867,495 A * | 2/1999 | Elliott et al. ................. | 370/352 |
| 5,883,894 A | 3/1999 | Patel et al. | |
| 5,889,774 A | 3/1999 | Mirashrafi et al. | |
| 5,907,547 A | 5/1999 | Foladare et al. | |
| 5,913,176 A | 6/1999 | Barabash | |
| 5,923,659 A | 7/1999 | Curry et al. | |
| 5,930,348 A | 7/1999 | Régnier et al. | |
| 5,951,638 A | 9/1999 | Hoss et al. | |
| 5,953,504 A | 9/1999 | Sokal et al. | |
| 5,956,391 A | 9/1999 | Melen et al. | |
| 5,958,005 A | 9/1999 | Thorne et al. | |
| 5,960,416 A | 9/1999 | Block | |
| 5,999,525 A | 12/1999 | Krishnaswamy et al. | |
| 6,064,653 A | 5/2000 | Farris | |
| 6,067,442 A | 5/2000 | Wiedeman et al. | |
| 6,069,890 A | 5/2000 | White et al. | |
| 6,073,160 A | 6/2000 | Grantham et al. | |

(List continued on next page.)

FOREIGN PATENT DOCUMENTS

| | | |
|---|---|---|
| EP | 0123456 | 1/2000 |
| WO | 97/16007 | 5/1997 |
| WO | WO 97/22209 | 6/1997 |
| WO | 97/22210 | 6/1997 |

OTHER PUBLICATIONS

Zimmerer, Eric, "SIP+ (Inter MGC Protocol); Edition 0.0", Level 3 Communications, Dec. 4, 1998, paragraph 0002, 02.1, 02.4, and Figure 4, <URL: www.cs.columbia.edu/sip/drafts/SIP+01.doc>.

Donovan, S., "The SIP Info Method", Internet Engineering Task Force, Feb. 8, 1999, the whole document.

Sijben, P. et al., "Toward the PSTN/Internet Inter–Networking; Media Device Control Protocol", Internet Engineering Task Force, Version .03, Feb. 9, 1999, paragraph 10.1 and 11.4.

(List continued on next page.)

*Primary Examiner*—Wellington Chin
*Assistant Examiner*—Raj Jain

(57) ABSTRACT

A method of providing IP telephony services maps a telephony signaling protocol called party number nature of address indicator to an Internet signaling protocol nature of address indicator and a telephony signaling protocol called party number numbering plan indicator to an Internet signaling protocol numbering plan indicator.

24 Claims, 2 Drawing Sheets

U.S. PATENT DOCUMENTS

| | | | |
|---|---|---|---|
| 6,078,583 | A | 6/2000 | Takahara et al. |
| 6,081,518 | A | 6/2000 | Bowman-Amuah |
| 6,084,952 | A | 7/2000 | Beerman, Jr. et al. |
| 6,094,525 | A | 7/2000 | Perlman et al. |
| 6,118,864 | A | 9/2000 | Chang et al. |
| 6,134,235 | A | 10/2000 | Goldman et al. |
| 6,137,869 | A | 10/2000 | Voit et al. |
| 6,144,667 | A * | 11/2000 | Doshi et al. ............... 370/401 |
| 6,147,975 | A | 11/2000 | Bowman-Amuah |
| 6,151,390 | A * | 11/2000 | Volftsun et al. ............ 379/229 |
| 6,151,629 | A | 11/2000 | Trewitt |
| 6,157,648 | A | 12/2000 | Voit et al. |
| 6,161,008 | A | 12/2000 | Lee et al. |
| 6,163,536 | A | 12/2000 | Dunn et al. |
| 6,167,042 | A | 12/2000 | Garland et al. |
| 6,178,181 | B1 | 1/2001 | Glitho |
| 6,188,760 | B1 | 2/2001 | Oran et al. |
| 6,195,697 | B1 | 2/2001 | Bowman-Amuah |
| 6,295,697 | B1 | 2/2001 | Bowman-Amuah |
| 6,201,858 | B1 | 3/2001 | Sundhar |
| 6,202,081 | B1 | 3/2001 | Naudus |
| 6,215,858 | B1 | 4/2001 | Bartholomew et al. |
| 6,226,289 | B1 | 5/2001 | Williams et al. |
| 6,233,318 | B1 | 5/2001 | Picard et al. |
| 6,240,391 | B1 | 5/2001 | Ball et al. |
| 6,253,249 | B1 | 6/2001 | Belzile |
| 6,278,707 | B1 | 8/2001 | MacMillan et al. |
| 6,282,270 | B1 | 8/2001 | Porter |
| 6,292,479 | B1 | 9/2001 | Bartholomew et al. |
| 6,301,609 | B1 | 10/2001 | Aravamudan et al. |
| 6,333,931 | B1 | 12/2001 | LaPier et al. |
| 6,335,927 | B1 | 1/2002 | Elliott et al. |
| 6,335,968 | B1 | 1/2002 | Malik |
| 6,339,594 | B1 | 1/2002 | Civanlar et al. |
| 6,366,576 | B1 | 4/2002 | Haga |
| 6,381,316 | B2 | 4/2002 | Joyce et al. |
| 6,411,705 | B2 | 6/2002 | Oran et al. |
| 6,426,955 | B1 | 7/2002 | Gossett Dalton, Jr. et al. |
| 6,453,034 | B1 | 9/2002 | Donovan et al. |
| 6,463,053 | B1 | 10/2002 | Chen |
| 6,507,647 | B1 * | 1/2003 | Mandalia ................... 370/352 |
| 6,515,997 | B1 * | 2/2003 | Feltner et al. .............. 370/401 |
| 6,519,242 | B1 | 2/2003 | Emery et al. |
| 6,529,499 | B1 | 3/2003 | Doshi et al. |
| 6,567,399 | B1 | 5/2003 | Schuster et al. |
| 6,584,110 | B1 | 6/2003 | Mizuta et al. |
| 6,658,022 | B1 | 12/2003 | West et al. |

OTHER PUBLICATIONS

Schulzrinne et al., "RTP Payload for DTMF Digits, Telephony Tones and Telephony Signals", Internet Engineering Task Force, Jun. 9, 1999, paragraph 0001, <URL: www.openphone.org/docs/dtmf/tones.pdf.>.

H. Schulzrinne, A Comprehensive Multimedia Control Architecture for the Internet, 1997 IEEE, pp. 65–76.

Rosenberg et al. Internet Telephony Gateway Location, 1998 IEEE, pp. 488–496.

Wedlund et al. Mobility Support Using SIP, 1999 Association for Computing Machinery, pp. 76–82.

Handley et al., "SIP: Session Initiation Protocol", Network Working Group, Request for Comments 2543, Mar. 1999, pp. 1–104.

Camarillo et al., "The SDP Fid Attribute", Internet Engineering Task Force, Internet Draft, Apr. 2001, pp. 1–4.

Rosenberg, "SIP: Past, Present and Future", www.dynamicsoft.com, May 10, 2000.

Cable Television Laboratories, Inc., "PacketCable CMS to CMS Signaling Specification", Nov. 28, 2000.

Marshall et al., "SIP Proxy–to–Proxy Extensions for Supporting DCS" SIP Working Group Internet Draft, Nov. 2000, pp. 1–24.

Woods, D., "Translating Menus at the VOIP Café", www.networkcomputing.com/1026/1026wsl.html, Dec. 27, 1999, pp. 1–4.

Cisco Systems, Inc., "Architecture for Voice", Video and Integrated Data, 2000, pp. 1–23.

Schulzrinne, H., "The Session Initiation Protocol (SIP)", www.cs.columbia.edu/~hgs, Sep. 28, 2000.

Schulzrinne, H., Internet Telephony and Multimedia, Status and Directions, Aug. 7, 2000.

Schulzrinne et al., "The Session Inititiation Protocol: Internet–Centric Signalling", IEEE Communications Magazine, Oct. 2000, pp. 134–141.

Dalgic et al., "True Number Portability and Advanced Call Screening in a SIP–Based IP Telephony System", IEEE Communications Magazine, Jul. 1999, pp. 96–101.

* cited by examiner

ADDRESS DEFINITION FOR IP TELEPHONY SERVICES

BACKGROUND

The present invention relates generally to the field of Internet telephony, and more particularly to a method of and system for providing address definition for public switched network terminated calls that use Internet telephony services.

DESCRIPTION OF THE PRIOR ART

The existing public switched telephone network (PSTN) environment provides a rich set of telephony services. In order to work properly, the services depend on address information that is carried as part of the call setup process. This address information includes the called party number and two qualifiers to the called party number. These qualifiers are the nature of address (NOA) and the numbering plan indicator (NPI).

The called party number and the qualifiers are used in the PSTN to determine how to handle calls. The nature of address can be subscriber, national, or international. The numbering plan indicator can be public (E. 164) or private. A dialed number address with NOA and NPI values indicating the called party number is an international public number will be routed differently than the same number that has NOA and NPI values indicating that it is in a private numbering plan.

Efforts are currently underway to extend the services to devices connected to Internet protocol (IP) networks. One protocol that has been developed to handle the called related signaling in the IP based networks is the session initiation protocol (SIP). The addressing mechanism built into the SIP specification supports only global and local numbers. The SIP specification does not support the NOA and NPI qualifiers used in the PSTN. As a result, is not possible to support all of the existing PSTN services when one leg of a call must pass through an IP network or terminate to the device on an IP network.

SUMMARY

The present invention provides a method of and system for providing IP telephony services by mapping a telephony signaling protocol called party number nature of address indicator to an Internet signaling protocol nature of address indicator and mapping a telephony signaling protocol called party number numbering plan indicator to an Internet signaling protocol numbering plan indicator. The present invention is preferably implemented by extending the session initiation protocol (SIP) invite request called party URL to include a nature of address parameter and a numbering plan parameter. The system of the present invention provides a gateway that performs the mapping.

DESCRIPTION OF THE PREFERRED EMBODIMENT

Figure 1:
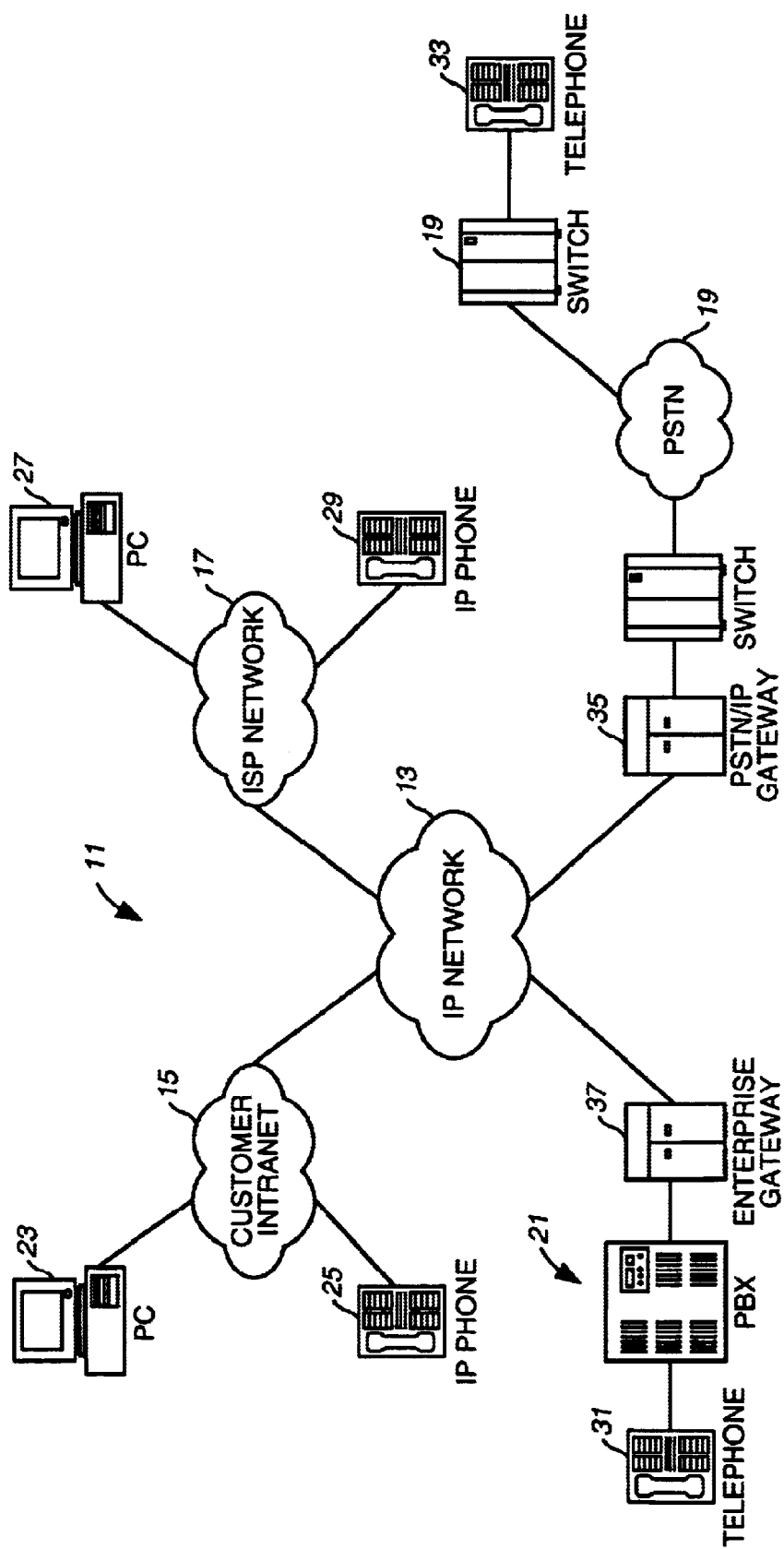
FIG. 1 is a block diagram of an Internet telephony system.

Referring now to the drawings, and first to FIG. 1, a telecommunications system is designated generally by the numeral 11. System 11 includes a plurality of networks that are interconnected through an IP network 13, which in the preferred embodiment is the Internet.

The networks of system 11 include, in addition to IP network 13, a private intranet 15, and Internet service provider network 17, a public switched telephone network 19, and a private telephone network designated generally by the numeral 21. All of the networks in system 11 are adapted to provide IP telephony services.

In IP telephony, at least a portion of a call is transported over an IP network. Call setup and tear down are supported by an IP signaling protocol such as session initiation protocol (SIP) or H.323. The preferred embodiment of the present invention is implemented using the SIP signaling protocol. Media transport is supported by an IP protocol such as real-time transport protocol (RTP).

In the environment of private intranet 15, IP telephony enabled devices, such as IP enabled personal computers 23 and IP phones 25, are connected to private intranet 15 through local area network (LAN) connections. Personal computers 23 and IP phones 25 are SIP clients or user agents. They are provided with software that enables them to initiate and participate in IP telephony sessions. Similarly, in the environment of Internet service provider network 17, IP telephony devices, such as personal computers 27 and IP phones 29, are operably connected to Internet service provider network 17, typically through dial-up modem connections. Again, personal computers 27 and IP phones 29 are SIP clients or user agents, which allows them to initiate and participate in IP telephony sessions.

In the environments of private telephone network 21 and public switched telephone network 19, devices such as telephones 31 and 33 do not have the native capacity to participate in IP telephony sessions. Networks such as private network 21 and PSTN 19 use traditional telephony signaling protocols such as SS7, ISDN, or channel associated signaling (CAS) for call setup and tear down. Networks such as PSTN 19 and private network 21 use traditional time. division multiplexed circuits for media transport. In order for users and networks such as PSTN 19 and private network 21 to participate in IP telephony sessions, a gateway to an IP network must be provided. In the case up PSTN 19, a PSTN/IP gateway 35 is provided. In the case of private network 21, an enterprise gateway 37 is provided.

Figure 2:
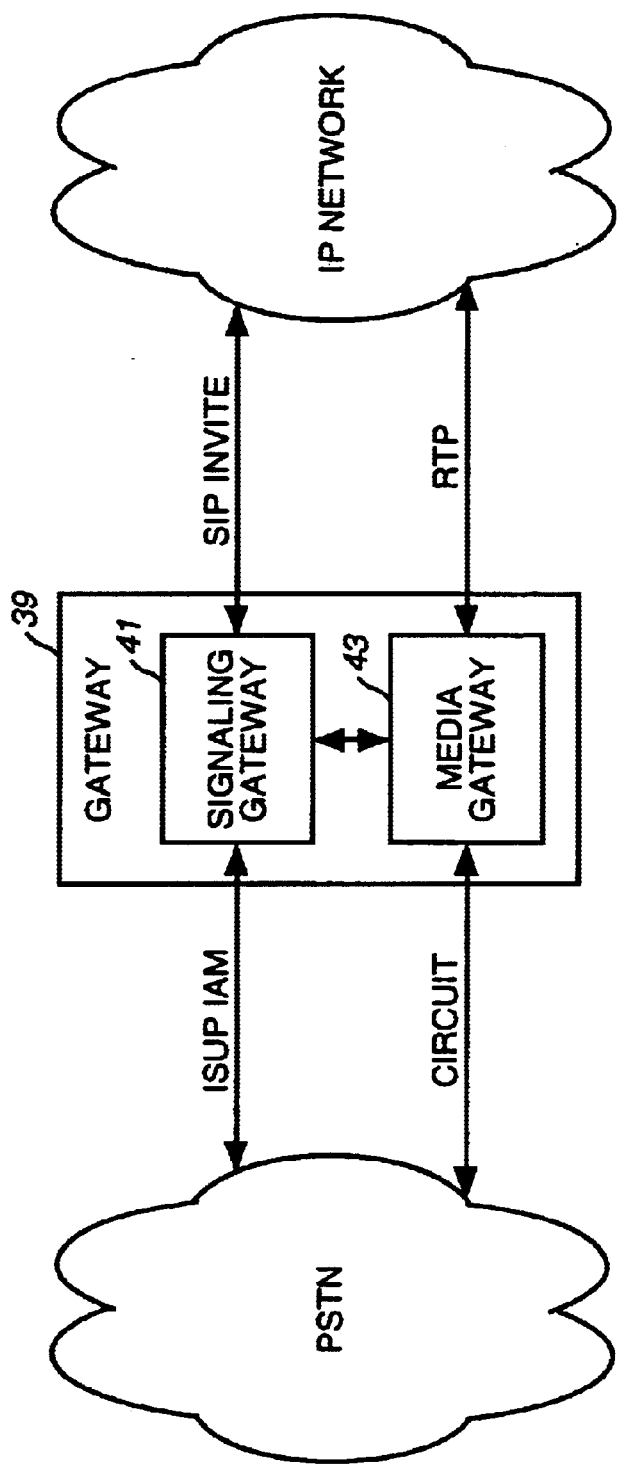
FIG. 2 is a block diagram of an Internet telephony gateway.

Referring to the FIG. 2, an EP telephony gateway is shown at 39. Gateway 39 includes a signaling gateway 41 and the media gateway 43. Generally, signaling gateway 41 provides bidirectional protocol translation between a telephony signaling protocol, such as SS7, and an IP telephony signaling protocol, such as SIP. As shown FIG. 2, signaling gateway 41 is adapted to provide bidirectional translation between, for example, ISDN user part (ISUP) initial address messages (IAM) and SIP invite requests. Media gateway 43 is adapted to provide bidirectional protocol translation between traditional time division multiplexed telephony circuits and real-time transport protocol packets.

Traditional telephony has developed a rich set of services with a rather limited addressing scheme. The traditional telephone user is able only to enter digits. Public switched telephone network switches and intelligent network elements are able to interpret the entered digits with the aid of a nature of address (NOA) indicator and a numbering plan indicator (NPI). The NOA and NPI enable the switches and intelligent network elements to correctly interpret the called party number.

As an example of public switched telephone network addressing, consider the digits 17035551234, NOA equal international, NPI equal public. This example indicates an international call to country code 1, area code 703, subscriber 555-1234. The same digits 17035551234 with NOA equal subscriber and NPI equal private indicates a special call subscriber 17035551234. A public switched telephone network switch can interpret the first example and route the call appropriately. Since the second example uses a private numbering plan, the switch must consult a database, such as a service control point (SCP) forrouting instructions.

Session initiation protocol does addressing by mapping telephone numbers to URLs. SIP URLs are of the form Atelephone_number@gateway. For example, telephone number 17035551234 maps to SIP URL SIP:17035551234@xyz.com. Currently, the SIP standard defines only two types of telephony URLs—global and local. The global URL is of the form country code plus national number. The local URL is anything that is not global. Currently, signaling gateways ignore NOAs and NPIs, and map only the dialed digits portion of an SS7 called party number to a SIP to URL. Thus, SIP can interpret the number 17035551234 only as an international call.

According to the present invention, SIP is extended to include an NOA parameter and an NPI parameter in telephony URLs. Thus gateways according to the present invention map the entire called party number, including the NOA and NPI, to a SIP URL. For example, an SS7 IAM message with a called party number 17035551234, NOA=subscriber, NPI=private maps to a SIP invite request of the form:
INVITE: 17035551234@xyz.com,NOA=subscriber,NPI=private
FROM:7774321@abc.com
TO:17035551234@xyz.com,NOA=subscriber,NPI=private.

The present invention thus enables the public switched telephone network to properly interpret telephone numbers that have been transported via IP telephony signaling and provide appropriate services. The present invention allows IP telephony to take advantage of the existing set of service provided by the PSTN.

What is claimed is:

1. A method of providing IP telephony services, which comprises the steps of:
    mapping a telephony signaling protocol called party number nature of address indicator to an Internet signaling protocol nature of address indicator; and
    mapping a telephony signaling protocol called party number numbering plan indicator to an Internet signaling protocol numbering plan indicator.

2. The method as claimed in claim 1, wherein said Internet signaling protocol is session initiation protocol.

3. The method as claimed in claim 2, wherein said Internet protocol nature of address indicator and said Internet protocol number plan indicator are contained in an invite request.

4. The method as claimed in claim 1, wherein said telephony signaling protocol is SS7.

5. The method as claimed in claim 4, wherein said telephony signaling protocol is ISUP.

6. The method as claimed in claim 1, wherein said telephony signaling protocol is ISDN.

7. The method as claimed in claim 1, wherein said telephony signaling protocol is CAS.

8. The method as claimed in claim 5, wherein said telephony protocol nature of address indicator and said telephony protocol number plan indicator are contained in an initial address message.

9. A method of providing telephony services, which comprises the steps of:
    receiving a call setup message in a first signaling protocol at a gateway between a first network and a second network, said call setup message including a called party number, said called party number including a numbering plan indicator and a nature of address indicator; and
    generating a call setup message in a second signaling protocol at said gateway between said first network and said second network, said call setup message in said second signaling protocol including said called party number, said called party number including said numbering plan indicator and said nature of address indicator.

10. The method as claimed in claim 9, wherein said first network is a public switched telephone network and said second network is an IP network.

11. The method as claimed in claim 10, wherein said first signaling protocol is SS7 and said second signaling protocol is session initiation protocol.

12. The method as claimed in claim 9, wherein call setup message in said first protocol is an initial address message and said call setup message in said second protocol is an invite request.

13. The method as claimed in claim 9, wherein said first network is an IP network and said second network is a public switched telephone network.

14. The method as claimed in claim 9, wherein said first signaling protocol is session initiation protocol and said second signaling protocol is SS7.

15. The method as claimed in claim 9, wherein said first signaling protocol is session initiation protocol and said second signaling protocol is ISDN.

16. The method as claimed in claim 9, wherein said first signaling protocol is session initiation protocol and said second signaling protocol is CAS.

17. The method as claimed in claim 9, wherein call setup message in said first protocol is an invite request and said call setup message in said second protocol is an initial address message.

18. An IP telephony gateway, which comprises:
    means for mapping a telephony signaling protocol called party number nature of address indicator to an Internet signaling protocol nature of address indicator; and
    means for mapping a telephony signaling protocol called party number numbering plan indicator to an Internet signaling protocol numbering plan indicator.

19. The IP telephony gateway as claimed in claim 18, wherein said Internet signaling protocol is session initiation protocol.

20. The IP telephone gateway as claimed in claim 19, wherein said telephony signaling protocol is SS7.

21. The IP telephony gateway as claimed in claim 19, wherein said telephony signaling protocol is ISDN.

22. The IP telephony gateway as claimed in claim 19, wherein said telephony signaling protocol is CAS.

23. The IP telephony gateway as claimed in claim 19, wherein said telephony signaling protocol is ISUP.

24. The IP telephony gateway as claimed in claim 18, comprising:
    means for mapping an Internet signaling protocol called party number nature of address indicator to a telephony signaling protocol nature of address indicator; and
    means for mapping an Internet signaling protocol called party number numbering plan indicator to a telephony signaling protocol numbering plan indicator.

* * * * *